March 30, 1948. A. T. NEWELL 2,438,674
ANEMOMETER
Filed Nov. 16, 1945 2 Sheets-Sheet 1
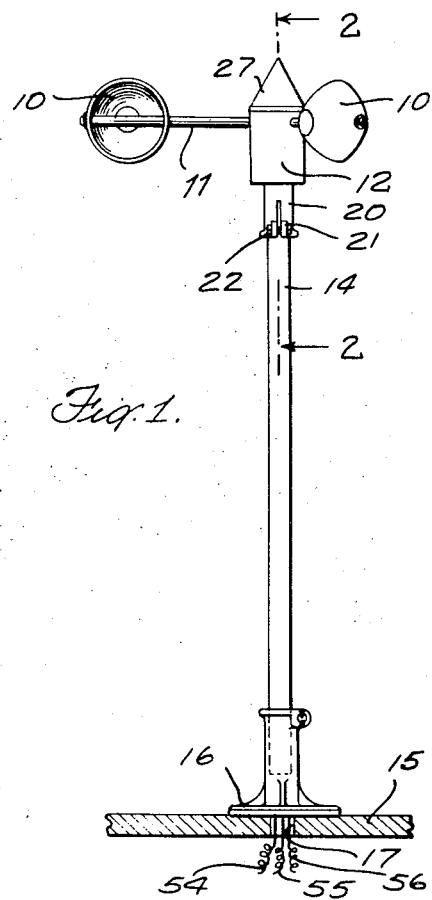
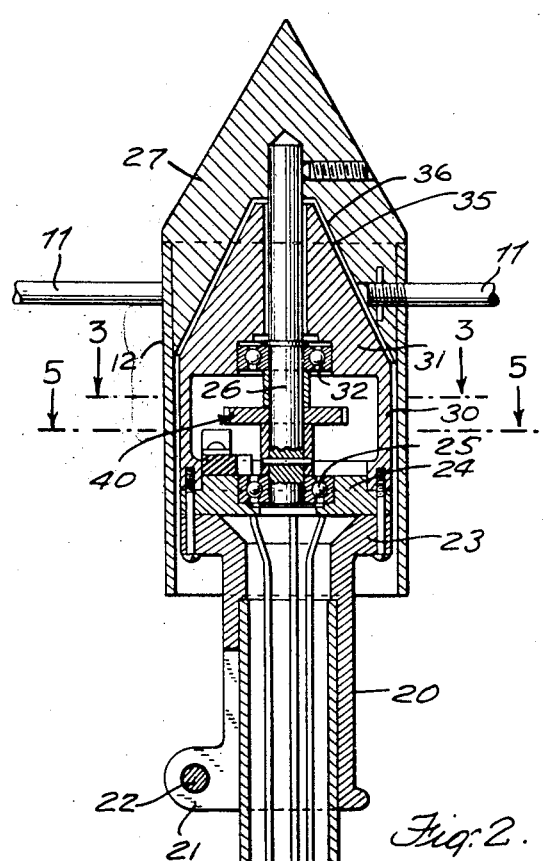
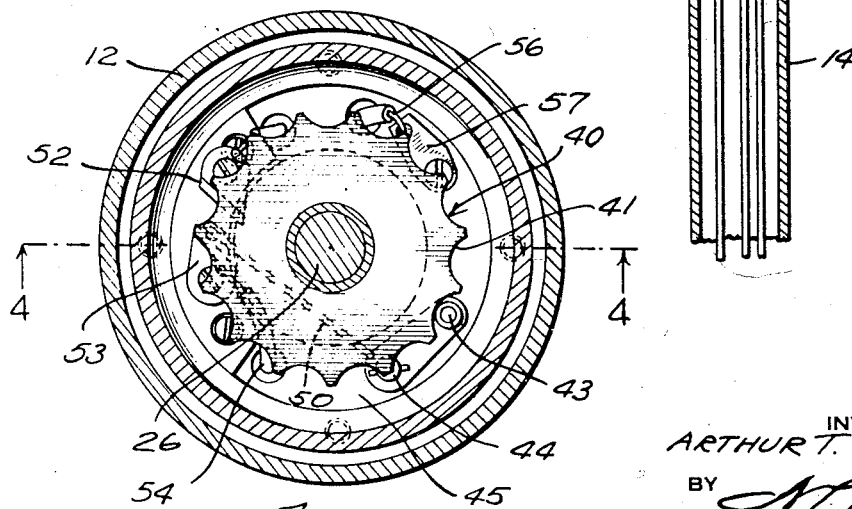
INVENTOR
ARTHUR T. NEWELL
BY
*N. L. Leek*
ATTORNEY March 30, 1948.  A. T. NEWELL  2,438,674
ANEMOMETER
Filed Nov. 16, 1945  2 Sheets-Sheet 2
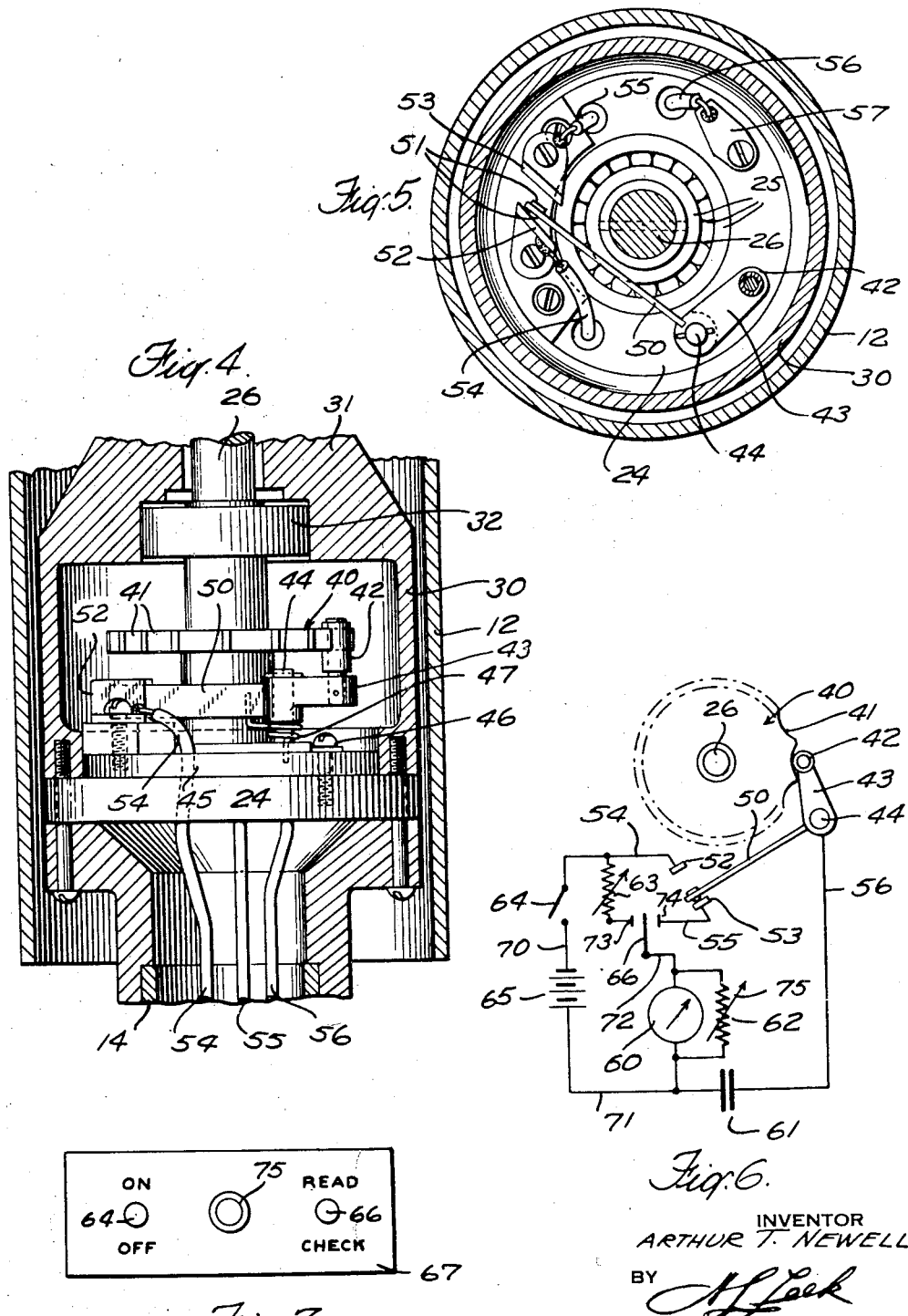
INVENTOR
ARTHUR T. NEWELL
BY
ATTORNEY Patented Mar. 30, 1948

2,438,674

UNITED STATES PATENT OFFICE 2,438,674

ANEMOMETER

Arthur T. Newell, Huntington, N. Y., assignor to Kenyon Instrument Co., Inc., Huntington Station, N. Y., a corporation of New York Application November 16, 1945, Serial No. 629,047

1 Claim. (Cl. 200—81.9)

This invention relates to a remote reading anemometer and more particularly to an anemometer of the rotating cone type having an electrical indicating circuit calibrated to indicate wind velocity.

An object of the invention is to provide a device of the above type having novel and improved details of construction and characteristics of operation.

Another object of the invention is to provide a device of the above type which is simple and accurate and which may be readily calibrated.

Another object is to provide a device of the above type in which the weight of the rotating parts is maintained at a minimum.

Various other objects and advantages will be apparent as the nature of the invention is more fully disclosed.

In accordance with the present invention, the rotating cone structure is provided with a housing which contains a contact mechanism. A cam is attached to the shaft of the rotating cone for actuating this contact mechanism so that the contacts are successively made and broken at a rate which is determined by the speed of rotation of the cone. The contacts are connected in an electric circuit including a condenser and battery and highly damped milliammeter which are so arranged that the condenser is alternately connected across the battery for charging and across the milliammeter for discharge. The rate of charge and discharge determines the value of the current which flows through the meter which may thus be calibrated to read directly in wind velocity or the velocity of the fluid in which the rotating cones are positioned.

The invention also provides a calibration panel by which the meter may be calibrated from time to time so as to compensate for variations in battery voltage or contact condition, or other variables which affect the reading.

Although the novel features which are believed to be characteristic of this invention are pointed out more particularly in the claim appended hereto, the nature of the invention will be better understood by referring to the following description taken in connection with the accompanying drawings in which a specific embodiment thereof has been shown for purposes of illustration.

In the drawings:

Fig. 1 is a side elevation of a rotating cone unit embodying the present invention;

Fig. 2 is a longitudinal section of the bearing housing and hub of the cone unit on an enlarged scale, taken on the line 2—2 of Fig. 1;

Fig. 3 is a transverse section taken on the line 3—3 of Fig. 2;

Fig. 4 is a longitudinal section taken on the line 4—4 of Fig. 3 showing the arrangement of the contact cam;

Fig. 5 is a transverse section taken on the line 5—5 of Fig. 2 showing the contact mechanism;

Fig. 6 is a schematic wiring diagram illustrating the circuits and connections; and Fig. 7 is an elevation of the calibration panel which forms a part of the system.

Referring to the drawings more in detail, the invention is shown as applied to a rotating cone unit comprising a plurality of cups 10 mounted on radial arms 11 extending from a hollow hub 12 which is mounted for rotation on a post 14. The post 14 may be attached to a suitable support 15 by means shown as a flange 16 attached to the lower end of the post 14. The support 15 is provided with an opening 17 through which the electrical cables pass to the indicating instrument to be described.

Referring to Fig. 2 the bearing support is shown as comprising a stationary sleeve 20 which is attached at the top of the post 14 by a split clamp 21 having a clamping screw 22. The sleeve 20 is flared outwardly at its upper end to provide a flange 23 on which a bearing ring 24 is supported. The bearing ring 24 carries a ball bearing 25 in which a shaft 26 is journaled. The shaft 26 carries at its upper end a cap 27 to which is attached a downwardly extending sleeve forming the hollow hub 12. A housing 30 is mounted on the bearing ring 24 and extends upwardly within the hub 12, having a cone 31 in which a ball bearing 32 is mounted to form an upper bearing for the shaft 26. The cone 31 forms a stationary sleeve which extends around the shaft 26 and is provided at its top with a tapered surface 35 which registers with a similar tapered surface 36 in the cap 27. The surfaces 35 and 36 are of similar shape and have a running clearance. The surfaces 35 and 36 accordingly form a seal to prevent moisture or other foreign matter from being driven into the bearings 25 and 32 from the outside.

In the chamber formed around the shaft 26 between the bearing ring 24 and the cone 31, there is provided a cam wheel 40 attached to the shaft 26. The cam wheel 40 is provided with an outer toothed cam surface 41 which engages a roller 42 (Fig. 4) mounted on an arm 43. The arm 43 is pivotally mounted on a pin 44 which is held in a plate 45 attached to the bearing ring 24 by any suitable means, shown as screws 46. The pin 44 also carries a spring 47 which serves to hold the roller 42 against the surface of the cam wheel 40. The arm 43 carries a flexible contact arm 50 having at its end contacts 51 which are positioned to engage stationary contacts 52 and 53 (Fig. 5). The contacts 52 and 53 are supported by but insulated from the plate 45. Connection is made to the contacts 52 and 53 by leads 54 and 55 respectively. Connection is made to the contact arm 50 through the plate 45 by means of a lead 56 attached to a clip 57 which is secured to said plate. The leads 54, 55 and 56 extend downwardly through the sleeve 20 and through the post 14 to the indicating panel which carries an ammeter 60 (Fig. 6), a condenser 61, resistances 62 and 63, an on-and-off switch 64, a battery 65, a check switch 66, and a calibration panel 67 (Fig. 7).

The electrical connections for these elements are shown more in detail in Fig. 6. The lead 54 is connected to one side of the resistance 62 and thence to one side of the on-and-off switch 64 which is in turn connected by a lead 70 to the one side of the battery 65. The other side of the battery 65 is connected by a lead 71 to one side of the milliammeter 60 and to one side of the condenser 61. The other side of the condenser 61 is connected to the lead 56. The other side of the meter 60 is connected by a lead 72 to the blade of the calibration switch 66 which is of the single-pole, double-throw type. One stationary contact 73 of this switch is connected to the resistance 63. The other stationary contact 74 is connected to the lead 55. The meter 60 is shunted by the adjustable calibration resistor 62, the adjustment of which is controlled by a knob 75 mounted on the panel 67. The resistor 63 is adjustable by means mounted within the casing.

As a specific example, the condenser 61 may have a value of .5 mfd., the battery 65 may comprise a 22½ volt "B" battery and the meter 60 may comprise a milliammeter having a maximum reading of, for example, 1 milliampere. The resistor 62 may have a resistance of the order of 200 ohms and the resistor 63 may have a resistance of the order of 25,000 ohms.

In the operation of this device, the rotating cones may be mounted at some suitable position such as on the masthead of a ship or above the roof of a building and will rotate at a rate which is a function of wind velocity. Rotation of the shaft 26 causes the cam 40 to rotate and thereby successively make and break the contacts 52 and 53.

Referring to the wiring diagram of Fig. 6, the switch 66 is assumed to be in the "read" position with the contact 74 closed and the on-and-off switch 64 closed. When the contact arm 50 makes contact with the contact 52, a circuit is established from the battery 65 through the contact arm 50 to the condenser 61 which charges the condenser. When the arm 50 is in contact with the contact 53, a circuit is established from the condenser 61 through the arm 50, contact 53, and contact 73 to the meter 60, thereby discharging the condenser 61 through the meter 60.

The shunt resistor 62 is assumed to be adjusted so that under the conditions specified the meter 60 gives a reading which is a true indication of the wind velocity.

The instrument is initially calibrated in the factory by placing the cups 10 in an air stream of known velocity as, for example, in a wind tunnel. The resistor 62 is then set by means of the knob 75 to cause the meter 60 to give a correct reading. Then without changing the adjustment of the resistor 62, the switch 66 is changed to the "check" position in which the contact 73 is closed. The resistor 63 is then adjusted to give a full scale deflection on the meter 60 and is permanently set in this position. The switch 66 is then changed to the "read" position in which the contact 74 is closed and the device is ready for use. At any subsequent time the device may be recalibrated by throwing the switch 66 to the "check" position and adjusting the resistor 62 by means of the calibration knob 75 so that the meter 60 has a full scale deflection. This adjustment compensates for any circuit variation, such as changes in battery voltage or in contact resistance, or the like. Thereafter the switch 66 may be returned to "read" position to close the contact 74 and the device may be operated in the usual manner. The switch 64 is preferably opened when the device is not in use in order to eliminate battery drain. It has been found, however, that under normal conditions of use, a standard B battery will operate the device for many months. It is not necessary to re-calibrate the device for each use. However, it may be calibrated at intervals by the means above described so that it may be maintained in accurate operating condition. It has been found that a device of this type may be calibrated to give readings of an accuracy of within two per cent and will maintain that accuracy over long periods of time, provided it is recalibrated at intervals to compensate for changed circuit conditions.

The arrangement is such that air and moisture are prevented from entering the bearings or affecting the contacts 52 and 53. This is an important feature when the device is to be used on shipboard. It will be noted that the hub 12 extends downwardly over the bearing section so as to shield the entire device and to prevent any moisture from being driven upwardly into the bearing chamber. Inasmuch as only the contacts and actuating cam are mounted on the rotating head, the rotating parts are comparatively light. Hence they may be mounted on the mastheads of small boats without interference with the operation thereof. The indicating and calibrating panel may of course be located at any remote point and may be connected by leads with the rotating head.

Although a specific embodiment of the invention has been shown for purposes of illustration, it is to be understood that various uses and adaptations may be made therein as will be readily apparent to a person skilled in the art. The invention is only to be restricted in accordance with the scope of the following claim:

What is claimed is:

A remote reading anemometer comprising a post, a housing mounted on said post having a cylindrical wall and upper and lower closure members forming a closed chamber and carrying upper and lower bearings, said upper closure member having a conical surface of substantial extent extending above the upper bearing to shield the same, a shaft journaled in said bearings and projecting upwardly beyond the upper closure member, a cap mounted on said shaft having a lower conical surface registering with and having a running fit over the conical surface of said upper closure member, a sleeve on said cap extending downwardly around said cylindrical wall and projecting below said lower closure member, radial arms carried by said sleeve, wind cups on said arms, a switch located in said chamber, a cam disc carried by said shaft within said chamber, and a cam follower actuated by said cam disc and connected to actuate said switch.

ARTHUR T. NEWELL.

REFERENCES CITED

The following references are of record in the file of this patent:

UNITED STATES PATENTS

| Number | Name | Date |
| --- | --- | --- |
| 1,441,207 | Blakeslee | Jan. 9, 1923 |
| 1,779,783 | Sylvander et al. | Oct. 28, 1930 |
| 1,829,489 | Mularkey | Oct. 27, 1931 |
| 2,150,489 | Chappell et al. | Mar. 14, 1939 |
| 2,206,849 | Miller | July 2, 1940 |

FOREIGN PATENTS

| Number | Country | Date |
| --- | --- | --- |
| 800,668 | France | May 4, 1936 |